(12) United States Patent
Dinkins

(10) Patent No.: US 11,944,219 B2
(45) Date of Patent: Apr. 2, 2024

(54) TREE NEEDLE CATCHER

(71) Applicant: Kirsten Dinkins, Tamassee, SC (US)

(72) Inventor: Kirsten Dinkins, Tamassee, SC (US)

( * ) Notice: Subject to any disclaimer, the term of this patent is extended or adjusted under 35 U.S.C. 154(b) by 612 days.

(21) Appl. No.: 17/111,035

(22) Filed: Dec. 3, 2020

(65) Prior Publication Data

US 2021/0161322 A1 Jun. 3, 2021

Related U.S. Application Data

(60) Provisional application No. 62/942,901, filed on Dec. 3, 2019.

(51) Int. Cl.
*A47G 33/04* (2006.01)
*A01G 13/02* (2006.01)

(52) U.S. Cl.
CPC ....... *A47G 33/045* (2013.01); *A01G 13/0281* (2013.01)

(58) Field of Classification Search
CPC ...... A47G 33/00; A47G 33/008; A47G 33/04; A47G 33/045; A47G 33/08; A47G 33/0827; A47G 33/0863; A47G 33/12; A47G 33/1206
USPC ...................................................... 206/423
See application file for complete search history.

(56) References Cited

U.S. PATENT DOCUMENTS

| | | | | |
|---|---|---|---|---|
| 3,727,347 | A * | 4/1973 | Barnes | A01G 13/0281 428/17 |
| 3,954,129 | A | 5/1976 | Rudell et al. | |
| 4,581,277 | A | 4/1986 | Neale | |
| 5,092,681 | A * | 3/1992 | Ashley, III | B65D 33/28 383/4 |
| 6,088,953 | A | 7/2000 | Morgan | |
| 8,230,812 | B2 * | 7/2012 | Ross | A01K 15/04 47/31 |
| 2003/0200589 | A1 * | 10/2003 | Therres | A47G 33/04 2/69 |
| 2004/0262183 | A1 | 12/2004 | Gildart | |
| 2007/0284273 | A1 * | 12/2007 | Bornemeier | A47G 33/045 206/423 |
| 2014/0130947 | A1 | 5/2014 | PeCoy | |

FOREIGN PATENT DOCUMENTS

| | | | | | |
|---|---|---|---|---|---|
| GB | 2241875 | A * | 9/1991 | ........... | A47G 33/045 |
| GB | 2263226 | A * | 7/1993 | ........... | A47G 33/045 |

* cited by examiner

*Primary Examiner* — Bryon P Gehman
(74) *Attorney, Agent, or Firm* — Boudwin Intellectual Property Law, LLC; Daniel Boudwin

(57) ABSTRACT

A tree needle catcher is provided. The device includes a flexible member having a central aperture. In some embodiments, the flexible member includes a fine mesh material defining a plurality of openings therethrough. In other embodiments, the flexible member includes a solid material wherein a plurality of openings is disposed about an outer edge of the flexible member. A linear slit extends through the flexible member between the central aperture and an outer edge of the flexible member, wherein the linear slit defines a first edge of the flexible member and a second edge of the flexible member.

4 Claims, 4 Drawing Sheets

TREE NEEDLE CATCHER

CROSS REFERENCE TO RELATED APPLICATIONS

This application claims the benefit of U.S. Provisional Application No. 62/942,901 filed on Dec. 3, 2019. The above identified patent application is herein incorporated by reference in its entirety to provide continuity of disclosure.

BACKGROUND OF THE INVENTION

The present invention relates to tree skirts and debris catchers. More particularly, the present invention pertains to a tree needle catcher configured to secure to and about the lower branches of a tree to prevent needles and other tree debris from contacting a floor surface.

Many individuals decorate their homes with live trees during the holidays. However, over the course of the holiday, tree needles or leaves often fall from the tree branches which then can mar the appearance of the tree or decorations. Tree needles may fall into gifts, lessening the enjoyment of the recipient if they must remove detritus from their giftwrapping. Additionally, if debris accumulates, it can present a fire hazard or slipping hazard to an individual walking nearby. In order to ensure that debris doesn't accumulate, individuals may be forced to frequently clean the area, possibly on a daily basis, which can quickly become frustrating and time consuming.

Additionally, when landscaping an area, users may wish to ensure that a landscaping bed area is kept clear of tree needles, leaves, or other debris. Similarly, individuals would be required to frequently clean the landscaping bed in order to maintain a desired yard aesthetic. Alternatively, individuals may hire landscapers to maintain the area, however, such services are often expensive. Therefore, an inexpensive and efficient method of preventing tree debris accumulating beneath a particular tree by catching needles or leaves as they fall to reduce cleaning and maintenance time is desired.

In light of the devices disclosed in the known art, it is submitted that the present invention substantially diverges in design elements from the known art and consequently it is clear that there is a need in the art for an improvement to existing tree skirts and debris catchers. In this regard, the instant invention substantially fulfills these needs.

SUMMARY OF THE INVENTION

In view of the foregoing disadvantages inherent in the known types of tree skirts and debris catchers now present in the known art, the present invention provides a tree needle catcher wherein the same can be utilized for providing convenience for the user when preventing tree needles and other debris from contacting a floor surface.

The present system comprises a flexible member having a central aperture. In some embodiments, the flexible member comprises a fine mesh defining a plurality of openings therethrough. In alternate embodiments, the flexible member comprises a solid material having a plurality of openings disposed about an outer edge of the flexible member. A linear slit extends through the flexible member between the central aperture and an outer edge of the flexible member. The linear slit defines a first edge of the flexible member and a second edge of the flexible member.

In some embodiments, a border of the central aperture comprises an elastic material such that the central aperture is adjustable in diameter. In another embodiment, the flexible member comprises a circular cross-section such that the linear slit extends radially therethrough. In other embodiments, a fastener is disposed on each of the first edge and the second edge at a border of the central aperture, the fastener configured to removably secure the first edge to the second edge along the central aperture. In yet another embodiment, the outer edge comprises a greater thickness than the flexible member, thereby defining a hem. In some embodiments, the hem further extends along each of the first edge and the second edge. In another embodiment, a plurality of hooks is removably securable to the flexible member via the plurality of openings. In other embodiments, each hook of the plurality of hooks comprises a malleable wire having a lower hook arm and an upper hook arm, wherein each of the upper hook arm and the lower hook arm are configured to bend to a desired size. In yet another embodiment, a grommet is disposed about a perimeter of each opening of the plurality of openings. In some embodiments, the plurality of openings are disposed at regular intervals.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
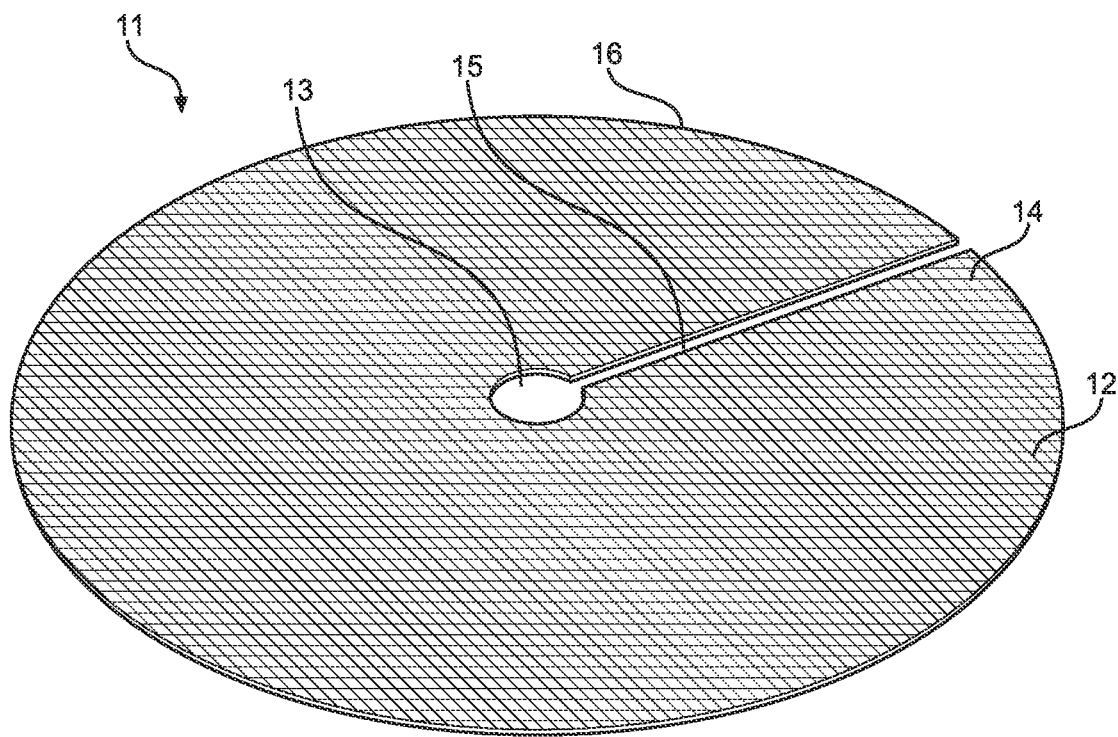
FIG. 1A shows a perspective view of an embodiment of the tree needle catcher.

Reference is made herein to the attached drawings. Like reference numerals are used throughout the drawings to depict like or similar elements of the tree needle catcher. The figures are intended for representative purposes only and should not be considered to be limiting in any respect.

Figure 1B:
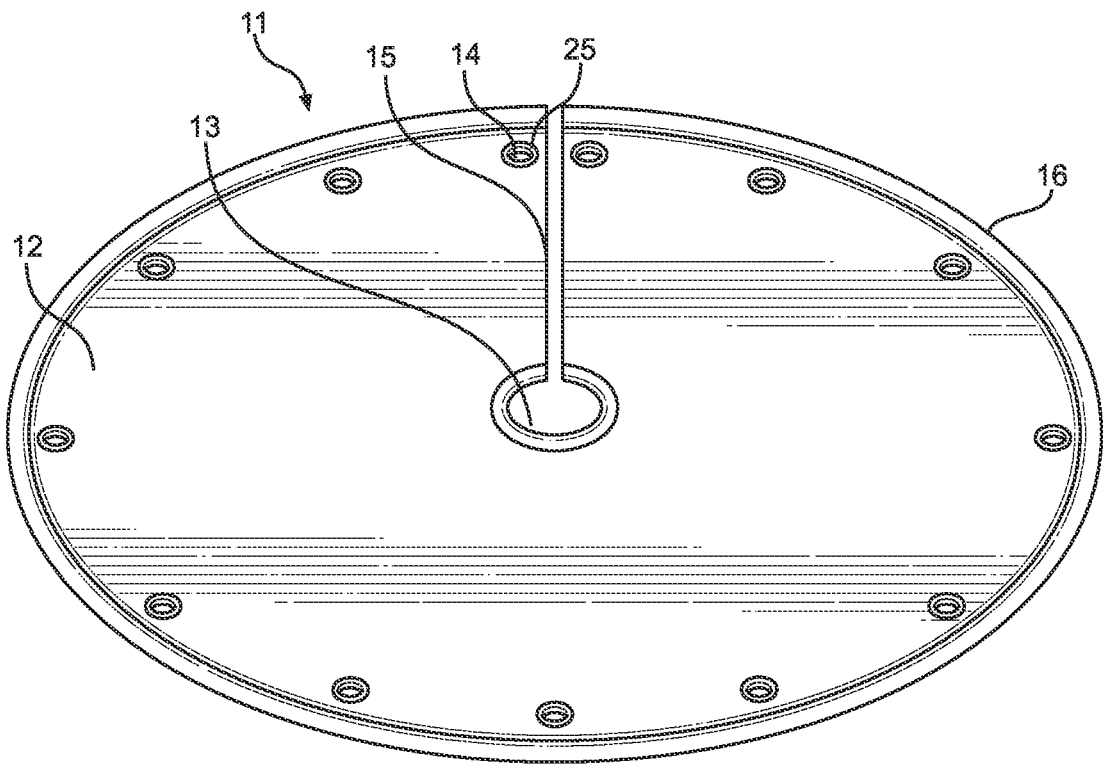
FIG. 1B shows a perspective view of an alternate embodiment of the tree needle catcher.
Figure 4:
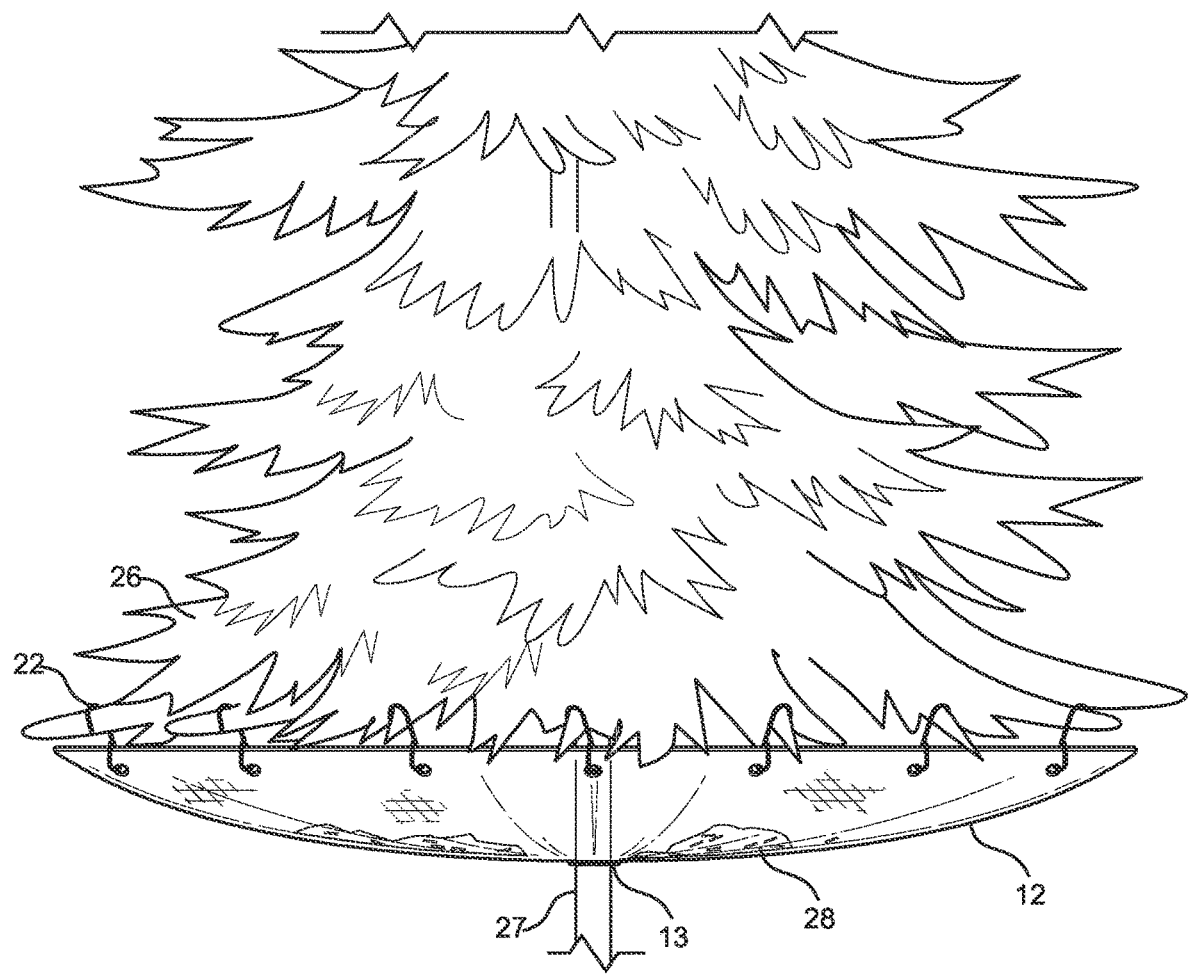
FIG. 4 shows a perspective view of an embodiment of the tree needle catcher in use.

Referring now to FIGS. 1A and 1B, there is shown a perspective view of an embodiment of the tree needle catcher and a perspective view of an alternate embodiment of the tree needle catcher respectively. The tree needle catcher 11 comprises a flexible member 12 having a central aperture 13 therethrough. The central aperture 13 is dimensioned to secure about a trunk of a tree (as shown in FIG. 4, 27). A linear slit 15 extends along the flexible member 12 between the central aperture 13 and an outer edge 16 of the flexible member 12. The linear slit 15 provides access to the central aperture 13 such that the central aperture 13 is open along a portion thereof, thereby allowing a user to place the flexible member 12 about a tree trunk. In the shown embodiment, the flexible member 12 comprises a circular cross-section, such that the linear slit 15 extends radially therethrough. The circular cross-section allows the flexible member 12 to conform with the general shape of most tree bases as tree branches typically define an approximately circular cross-section from the trunk. The diameter of the flexible member 12 is contemplated to include a variety of sizes to accommodate a wide range of tree sizes and varieties.

Figure 3:
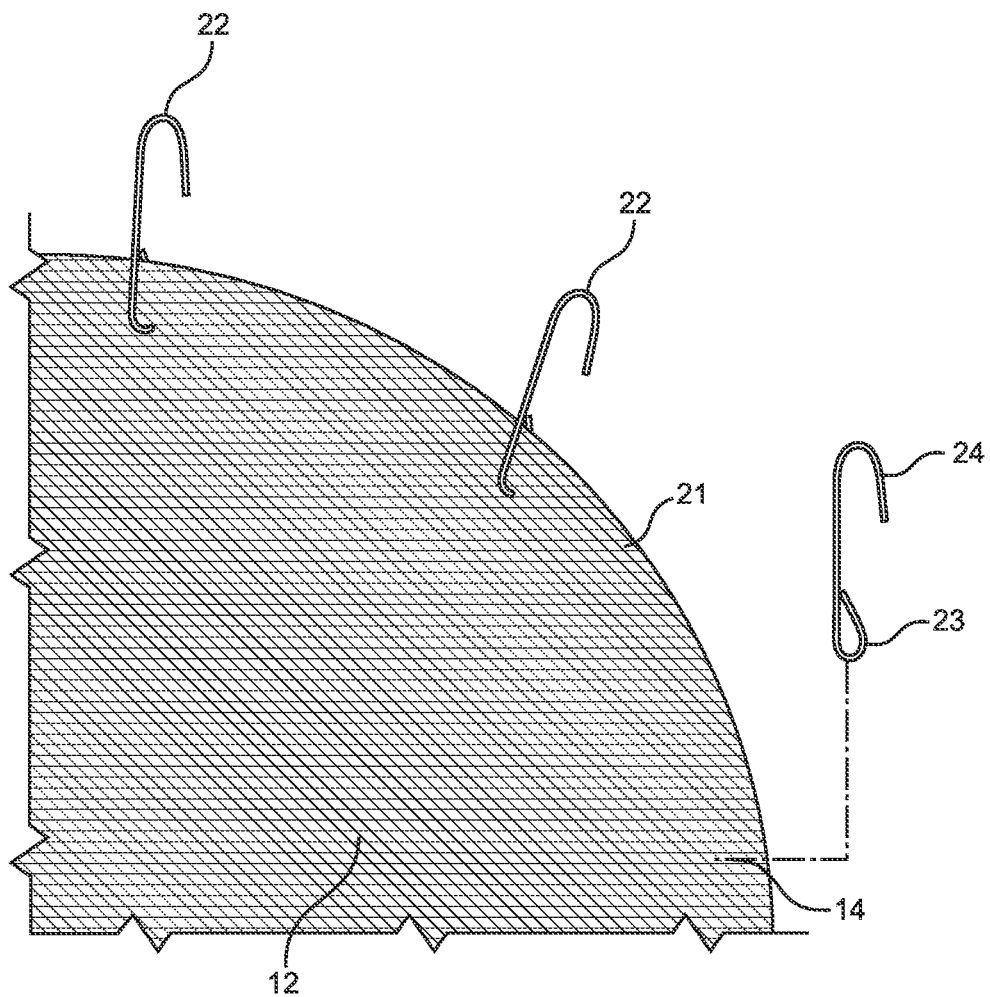
FIG. 3 shows a close-up exploded view of the plurality of hooks of an embodiment of the tree needle catcher.

In the illustrated embodiment of FIG. 1A, the flexible member 12 comprises a fine mesh material defining a plurality of openings 14 therethrough. The plurality of openings 14 is configured to receive a hook (as shown in FIG. 3, 22) therethrough to secure the flexible member 12 to the lower branches of a tree. The fine mesh material of the flexible member 12 is dimensioned such that the plurality of openings 14 formed thereby prevent needles, leaves, and other tree debris from passing therethrough, while simultaneously allowing a hook to pass therethrough. In this manner, the user can secure the flexible member 12 about a base of a tree via one or more hooks and ensure that any debris that falls from the tree is captured by the flexible member 12. In the illustrated embodiment, the entirety of the flexible member 12 comprises a fine mesh material, however, in alternate embodiments, a circular portion of the flexible member 12 adjacent to the outer edge 16 comprises a fine mesh material, while the remainder of the flexible member 12 is solid. Such an embodiment provides the user flexibility in hook placement, while ensuring that no needles or other tree debris fall through the central portion of the flexible member 12 when in use.

In the alternate embodiment of FIG. 1B, the flexible member 12 comprises a solid material, wherein the plurality of openings 14 are defined about a perimeter of the flexible member 12. In some embodiments, the plurality of openings 14 is disposed at regular intervals about the perimeter to ensure that the flexible member 12 is properly supported on a tree about an entirety thereof. The interval at which openings are places can vary across embodiments to ensure that sufficient securement points are provided to the user. In this manner, the flexible member 12 cannot sag between adjacent openings of the plurality of openings 14, thereby preventing debris collected therein to fall therefrom. In the illustrated embodiment, the plurality of openings 14 further comprise a grommet 25 about a perimeter thereof, wherein the grommet 25 is configured to provide structural integrity to the plurality of openings 14. In this manner, the grommets 25 prevent the plurality of openings 14 from tearing when significant weight is applied to the flexible body 12. In some embodiments, the grommets 25 comprise a rigid metal reinforcing member, whereas in other embodiments, the grommets 25 comprise a fabric reinforcement member to allow the plurality of openings 14 to flex.

Figure 2:
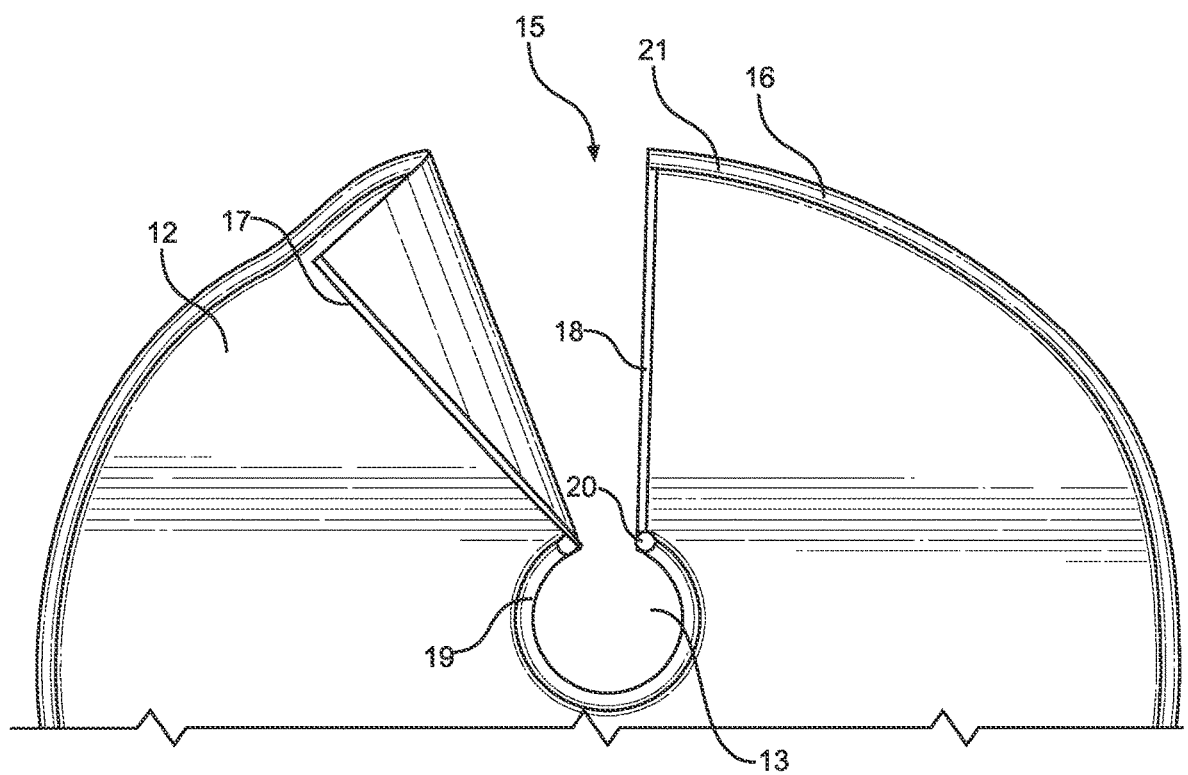
FIG. 2 shows a close-up view of the slit and central aperture of an embodiment of the tree needle catcher.

Referring now to FIG. 2, there is shown a close-up view of the slit and central aperture of an embodiment of the tree needle catcher. In some embodiments, the central aperture 13 further comprises an elastic border 19, wherein the border 19 is configured to selectively expand the diameter of the central aperture 13, such that the central aperture 13 can secure about tree trunks of various sizes. Furthermore, the elasticity of the border 19 secures the central aperture 13 about the tree trunk to prevent needles, leaves, or other debris from falling between the trunk and the flexible member 12. In the illustrated embodiment, the central aperture 13 is open along a portion thereof due to the linear slit 15. This linear slit 15 defines a first edge 17 and a second edge 18 of the flexible member 12. In some embodiments, the first and second edges 17, 18 overlap when secured about a tree trunk, such that the linear slit 15 can be secured in a closed position via insertion of a hook through the overlapping layers of the flexible member 12. This opening can be securely closed via a fastener 20 disposed on the border 19 along each of the first and second edges 17, 18. The fastener 20 is shown as a snap closure, however other fasteners 20 are contemplated in alternate embodiments, including hook and loop fasteners and the like.

In the illustrated embodiment, the flexible member 12 further comprises a hem 21 about the outer edge 16. The hem 21 comprises a thickness greater than the remainder of the flexible member 12 to increase structural integrity of the flexible member 12 about a perimeter thereof. In some embodiments, the hem 21 comprises a flexible reinforcement strip folded over and affixed to the outer edge 16. In some such embodiments, the hem 21 is sewn together about the ends opposite the fold, whereas in alternate embodiments, the hem 21 is secured together over the outer edge 16 via an adhesive, such as a heat activated adhesive typically used with fabric materials. In the illustrated embodiment, the hem 21 further extends along the first and second edges 17, 18 to the central aperture 13 where the hem 21 contacts the border 19. In this manner, the entirety of the central portions of the flexible member 12 are enclosed by the hem 21. In this manner, the hem 21 prevents fraying and tearing of the flexible member 12 about the perimeter thereof. For example, and as further described elsewhere herein, the hem 21 can provide a strengthened section about which a hook can be secured to ensure the hook remains affixed to the flexible member 12 without tearing the mesh or material of the flexible member 12.

Referring now to FIG. 3, there is shown a close-up exploded view of the plurality of hooks of an embodiment of the tree needle catcher. In the shown embodiment, a plurality of hooks 22 are secured through the plurality of openings 14 of the flexible member 12. In some embodiments, the plurality of hooks 22 each comprise a malleable wire having an upper hook arm 24 and a lower hook arm 23, wherein each of the upper and lower hook arms 24, 23 can be bent and folded to secure to a variety of objects. The lower hook arm 23 is inserted through an opening of the plurality of openings 14 to and can be secured to the flexible member 12 by bending the lower hook arm 23 about the flexible member 12. In some such embodiments, the lower hook arm 23 can be folded about the hem 21 of the flexible member 12 such that the lower hook arm 23 is closed about the hem 21, thereby ensuring that the hook 22 is affixed to the flexible member 12. The upper hook arm 24 can then be opened to secure about a tree branch or other securement location, such that the attached flexible member 12 is supported by the plurality of hooks 22. In other embodiments, the plurality of hooks 22 are rigid hook members to maximize strength and stability thereof.

Referring now to FIG. 4, there is shown a perspective view of an embodiment of the tree needle catcher in use. In one use, the plurality of hooks 22 can be inserted through the plurality of openings of the flexible member 12 and secured thereto. The flexible member 12 can then be secured about a tree trunk 27 via inserting the tree trunk 27 through the linear slit to be encircled by the central aperture 13. In some embodiments, the central aperture 13 can then be secured in the closed position via the fasteners as previously described. Once closed about the tree trunk 27, the user can then secure the linear slit in a closed position via overlapping the first and second edges of the flexible member 12 and securing a hook of the plurality of hooks 22 through the overlapping layers of the flexible member 12. The user can then secure each hook of the plurality of hooks 22 to a tree branch 26 along a base of the tree such that the flexible member is suspended thereunder. Debris 28, such as needles, leaves, and the like that fall from the tree branches 26 then are captured by the flexible member 12, ensuring that the surrounding area is not littered in debris 28. In this manner, the user can maintain the cleanliness and safety of the area directly under a desired tree to minimize the effort required to maintain and clean the surrounding area.

It is therefore submitted that the instant invention has been shown and described in various embodiments. It is recognized, however, that departures may be made within the scope of the invention and that obvious modifications will occur to a person skilled in the art, With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tree needle catcher, comprising:
 a flexible member having a central aperture;
 wherein the flexible member comprises a fine mesh defining a plurality of openings therethrough;
 a linear slit extending through the flexible member between the central aperture and an outer edge of the flexible member;
 wherein the linear slit defines a first edge of the flexible member and a second edge of the flexible member;
 further comprising a plurality of hooks removably securable to the flexible member via the plurality of openings.

2. The tree needle catcher of claim 1, wherein each hook of the plurality of hooks comprises a malleable wire having a lower hook arm and an upper hook arm, wherein each of the upper hook arm and the lower hook arm are configured to bend to a desired size.

3. A tree needle catcher, comprising:
 a flexible member having a central aperture;
 a plurality of openings disposed about an outer edge of the flexible member;
 a linear slit extending through the flexible member between the central aperture and an outer edge of the flexible member;
 wherein the linear slit defines a first edge of the flexible member and a second edge of the flexible member;
 further comprising a plurality of hooks removably securable to the flexible member via the plurality of openings.

4. The tree needle catcher of claim 3, wherein each hook of the plurality of hooks comprises a malleable wire having a lower hook arm and an upper hook arm, wherein each of the upper hook arm and the lower hook arm are configured to bend to a desired size.

\* \* \* \* \*